April 29, 1958    R. G. ADAMSON    2,832,954
SYNTHETIC GROUND TRACK INDICATOR
Filed March 17, 1955
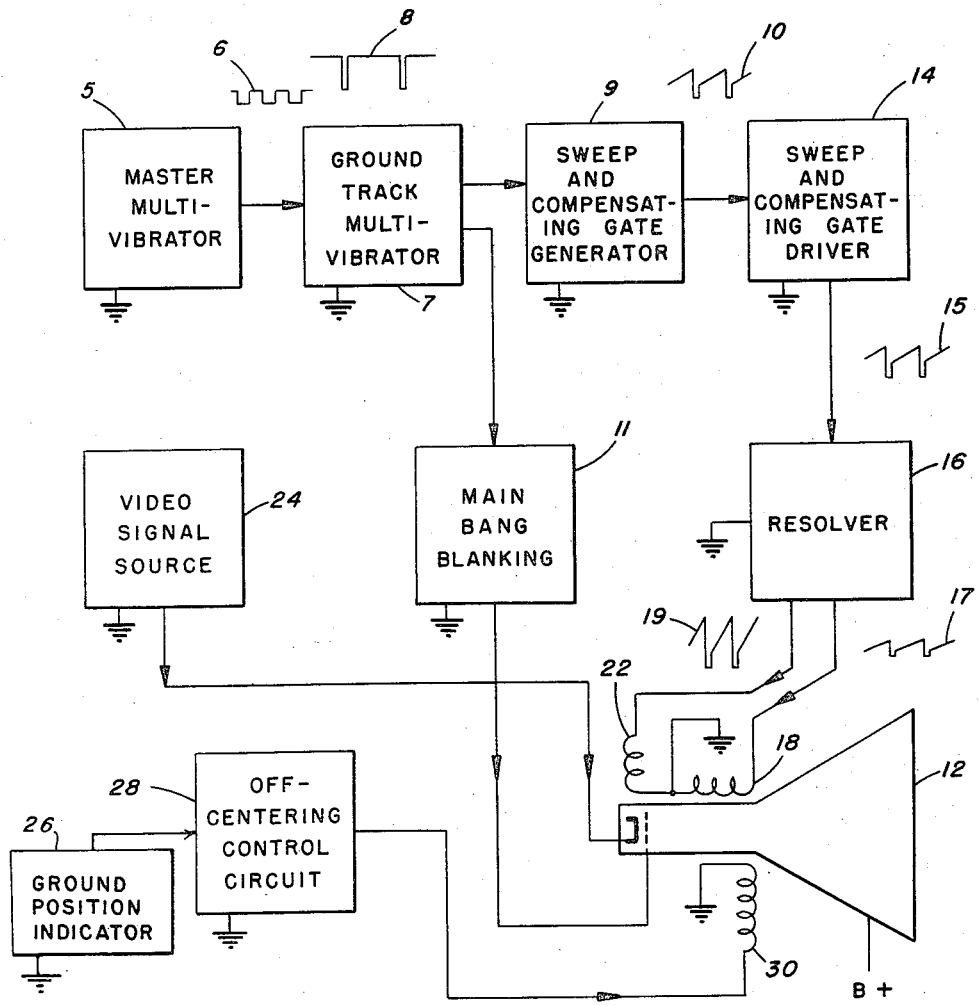
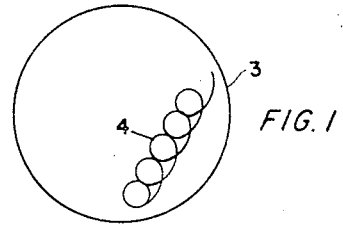
INVENTOR
ROBERT G. ADAMSON
BY
ATTORNEYS

2,832,954
SYNTHETIC GROUND TRACK INDICATOR

Robert G. Adamson, Lafayette Hill, Pa., assignor, by mesne assignments, to the United States of America as represented by the Secretary of the Navy Application March 17, 1955, Serial No. 495,071

7 Claims. (Cl. 343—17.1)

The present invention relates to a synthetic ground track indicator and more particularly to a synthetic ground track indicator employing a multivibrator control circuit.

Prior radar sets having a ground stabilized presentation, and accompanying ground track indication, rely on the transmitted R. F. energy leaking through the receiver to porivde a video signal at the start of the sweep. If the position of the sweep start on the cathode ray tube were a function only of the ground stabilization information supplied from an external ground position computer, the video pulse would trace out the path of the airplane or ship. However, with fast P. P. I. (plan position indication) sweeps (greater than 20 microseconds/inch) and high repetition rates (greater than 400 C. P. S.) the sweep start is a function of other elements of the system, notably the resolving device. This produces a slight "open center" in the presentation and the resulting ground track, for a straight ship's course, is a cycloidal path instead of a straight line.

The present system provides a synthetic ground track at proper intervals to replace the ground track generated in prior systems by the transmitted R. F. pulse. A ground track multivibrator is interposed between the master multivibrator and the sweep and compensating gate generator and main bang blanking circuit. In the art the term "main bang" refers to a signal derived from or related to the transmitted radar pulse and applied deliberately or inadvertently to the radar receiving circuits. For example in an "A" scope presentation the main bang is employed as a marker pip. A main bang blanking circuit is, as the term implies, a circuit employed to prevent operation of the radar indicator on the main bang. The ground track multivibrator generates an unsymmetrical square wave having a long pulse in the order of 1 second and a short pulse in the order of .02 second. During the long pulse period the sweep and main bang blanking operate as in normal radar indicator circuits. However, during the short pulse period the sweep and main bang blanking are turned off so that the electron beam rests at a point on the indicator face dictated by the deflection from a beam control circuit which is operated by a ground position indicator. This permits accurate ground track information to be momentarily applied to the presentation without distortion due to the sweep. Thus, over a period of time the sweep information and the ground track information are alternately applied to the indicator without interaction. This system eliminates the spiral ground track which would be obtained by prior systems and, at the same time, provides an accurate track whose intensity is easily controlled.

Accordingly an object of the present invention is the provision of a synthetic ground track indicator for a radar system.

Another object is to provide a system for alternately applying sweep information and ground track information to a radar indicator.

A further object of the present invention is the provision of a system for tracing out the course travelled by a moving object upon a cathode ray P. P. I. indicator simultaneously with the radar presentation.

Other objects and many of the attendant advantages of this invention will be readily appreciated as the same becomes better understood by reference to the following detailed description when considered in connection with the accompanying drawings wherein:

Fig. 1 is a ground stabilized cathode ray tube presentation obtained from a prior art radar system, and Fig. 2 shows a preferred embodiment of the present invention.

Referring now to the drawings, there is shown in Fig. 1, a cathode ray tube P. P. I. ground stabilized display in which the circle 3 is the outer periphery of the cathode ray tube and the spiral 4 is the ground track of the ship or aircraft upon which the radar system is mounted. Of course in the normal use of a rdar system there would be other images on the display but they have been omitted to simplify the explanation.

In a conventional P. P. I. display, the center is the aircraft or ship upon which the radar system is mounted and the remainder of the display is an image of the ground and surrounding objects as they would be seen from the aircraft or ship. In a ground stabilized display, the center is an image of a fixed object, and images of all objects that are not moving with respect to ground do not move on the display. The plane or ship upon which the radar system is mounted is seen as a spot moving across the display which is positioned with respect to the images of the ground objects as the plane or ship is positioned with respect to the actual ground objects. Of course the radar system is actually sweeping around the image of the plane or ship rather than the center of the display as in a conventional P. P. I. display, but the display is off-centered by means of a ground position computer system which computes the actual ground displacement of the plane or ship and continually off-centers the display by different amounts as the plane or ship moves so that the image of the ground as seen on the display is fixed. Thus, the spot representing the plane or ship which would normally be fixed at the center of the display is seen as moving. Difficulty is encountered with these conventional ground stabilized P. P. I. displays since, due to the fast repetition rates, the sweep doesn't start from a point which is the image of the plane or ship. Instead, the sweep start is a function of elements of the radar system such as the resolving device, and as a result an "open center" resembling a circle is produced on the presentation and the resulting ground tract 4 (Fig. 1) is a cycloidal path instead of a straight line. Thus, in these prior art radar systems, the path of the plane or ship can not be accurately determined. The system of the present invention, shown in Fig. 2, eliminates this spiral ground track 4 and, at the same time, provides an accurate track whose intensity is easily controlled.

In Fig. 2 there is shown a radar receiver comprising a master multivibrator 5 which sends out a wave 6 to ground track multivibrator 7 which in turn generates wave 8. During the long pulse period of wave 8, wave 6 is passed to the sweep and compensating gate generator 9 and the main bang blanking circuit 11. The output of the blanking circuit 11 is connected to the grid of cathode ray oscilloscope 12. Generator 9 feeds wave 10 to the sweep and compensating gate driver 14 which then feeds wave 15 to resolver 16. The output of resolver 16 comprises two waves 17 and 19 which are conducted to beam control coils 18 and 22 of the cathode ray oscilloscope 12. The received video radar signals (including those derived from the transmitted pulse) are transmitted from source 24 to the cathode of oscilloscope 12. Ground position indicator 26 feeds ground track information to the off-centering control circuit 28 which provides a signal for coil 30 of oscilloscope 12.

In operation the start of the sweep and compensating gate generator 9 and the main bang blanking circuit 11 is controlled by the master multivibrator 5 and ground track multivibrator 7. The ground track multivibrator 7 generates an unsymmetrical square wave 8 whose long pulse is in the order of 1 second and whose short pulse is in the order of .02 second. During the long pulse period the sweep and main bang blanking circuits operate as in conventional radar indicator circuits. However, during the short pulse period the sweep and main bang blanking circuits are turned off so that the electron beam rests at a point on the indicator face on scope 12 dictated by the deflection current in coil 30 from the off-centering control circuit 28. This permits accurate ground track information to be momentarily applied to the presentation without distortion due to the sweep. Thus, over a period of time the sweep information and the ground track information are alternately applied to the indicator without interaction. Since the ground track being a slowly moving spot represents a high concentration of energy from the electron beam of the indicator, it need be on only a small fraction of the total time, hence suitable tracking can be obtained with negligible loss of radar information. Although the system shown herein is based on a radial time base sweep which is resolved after the sweep driver tubes, it is equally applicable to systems in which the sweep is resolved before the sweep driver tubes. It is also to be understood that the specified operating periods of 1 second and .02 second of the ground track multivibrator 7 are not critical and that there are many other values equally suitable.

Obviously many modifications and variations of the present invention are possible in the light of the above teachings. It is therefore to be understood that within the scope of the appended claims the invention may be practiced otherwise than as specifically described.

What is claimed is:

1. A synthetic ground track indicator system comprising an indicator, means for providing ground position information to said indicator, means for providing sweep information to said indicator, and means for periodically de-energizing said means for producing sweep information.

2. A radar system comprising an indicator, sweep circuit means for supplying sweep information for said indicator, video means for providing video information for said indicator, means for providing ground position information for said indicator, and pulse generating means for controlling said sweep circuit means whereby the sweep information is periodically withheld from said indicator for short periods of time.

3. A radar system comprising a cathode ray oscilloscope, sweep circuit means for supplying sweep information to said oscilloscope thereby controlling the position of the electron beam, video means connected to provide video information for said oscilloscope, means for providing ground position information for producing a ground stabilized display on said oscilloscope, and unsymmetrical pulse generating means for controlling said sweep circuit means whereby the sweep information is periodically withheld from said oscilloscope for short periods of time.

4. A radar display system comprising in combination: a cathode ray oscilloscope, sweep circuit means for providing P. P. I. sweep information for said oscilloscope, video means for providing video pulses correlated with received radar information, means for providing ground position information to said oscilloscope for producing a ground stabilized display, and unsymmetrical square wave generating means connected to control said sweep circuit means whereby said P. P. I. sweep information is periodically withheld from said oscilloscope for short periods of time.

5. A radar system comprising in combination: a cathode ray oscilloscope, sweep circuit means for providing a P. P. I. sweep for said oscilloscope, a main bang blanking circuit connected to said oscilloscope, first control means for controlling the start of said sweep circuit means and said main bang blanking circuit, video means for providing pulses to said oscilloscope correlated with radar information, information means for producing ground position information for controlling the positioning of said P. P. I. sweep for providing a ground stabilized display on said oscilloscope, and second control means for periodically turning off the main bang blanking circuit and said sweep circuit means.

6. A radar system comprising in combination a cathode ray oscilloscope, first means for providing a radial time base sweep for said oscilloscope, second means for providing main bang blanking pulses for said oscilloscope, third means for generating periodic square waves for controlling said first and second means, fourth means for providing pulses correlated with received radar information to said cathode ray oscilloscope, fifth means for providing ground position information to said oscilloscope, and sixth means for periodically deenergizing said first and second means thereby allowing ground position information to be momentarily applied to the presentation without distortion due to the sweep.

7. A system for tracing out the course travelled by a moving object upon a cathode ray P. P. I. indicator simultaneously with a radar presentation comprising in combination: a cathode ray oscilloscope circuit having magnetic deflection control, three coils situated to provide the magnetic deflection control when currents flow therein, an off-centering control circuit connected to one of said three coils, means for providing ground position information of said moving object to said off-centering control circuit, video pulse means connected to the cathode of said oscilloscope circuit for providing radar information, a main bang blanking circuit connected to the grid of said oscilloscope circuit, a sweep and compensating gate generator circuit, a sweep and compensating gate driver circuit, a resolver circuit, connections between said generator driver and resolver circuits for providing a radial time base for said oscilloscope circuit, a master multivibrator connected to control the start of the sweep and compensating gate generator and the main bang blanking circuits, a groundtrack multivibrator for producing an unsymmetrical square wave comprising a long and a short pulse, and connections for said ground track multivibrator whereby during the long pulse period the sweep and main bang blanking circuits operate normally but during the short pulse period the sweep and the main bang blanking circuits are turned off so that the electron beam of the oscilloscope circuit rests at a point on the indicator face dictated by the deflection current from said off-centering control circuit.

References Cited in the file of this patent
UNITED STATES PATENTS

| | | |
|---|---|---|
| 2,701,352 | Kingdon | Feb. 1, 1955 |
| 2,727,229 | Anast | Dec. 13, 1955 |